(12) United States Patent
Laurent

(10) Patent No.: US 9,116,024 B2
(45) Date of Patent: Aug. 25, 2015

(54) DEVICE FOR MEASURING PARIETAL PARAMETERS

(75) Inventor: Ivan Laurent, Aix-en-Provence (FR)

(73) Assignee: Mc ACI, Aix-en-Provence (FR)

( * ) Notice: Subject to any disclaimer, the term of this patent is extended or adjusted under 35 U.S.C. 154(b) by 382 days.

(21) Appl. No.: 13/511,825

(22) PCT Filed: Nov. 10, 2010

(86) PCT No.: PCT/FR2010/000751
§ 371 (c)(1),
(2), (4) Date: May 24, 2012

(87) PCT Pub. No.: WO2011/064465
PCT Pub. Date: Jun. 3, 2011

(65) Prior Publication Data
US 2012/0285270 A1 Nov. 15, 2012

(30) Foreign Application Priority Data

Nov. 27, 2009 (FR) ...................................... 09 05715

(51) Int. Cl.
*G01D 11/30* (2006.01)
(52) U.S. Cl.
CPC ...................................... *G01D 11/30* (2013.01)
(58) Field of Classification Search
CPC ...................................................... G01N 37/00
USPC ........................................................... 73/147
See application file for complete search history.

(56) References Cited

U.S. PATENT DOCUMENTS

| | | | | |
|---|---|---|---|---|
| 2,602,329 | A * | 7/1952 | Clark | 73/147 |
| 4,592,229 | A * | 6/1986 | Butefisch et al. | 73/147 |
| 4,688,422 | A * | 8/1987 | Wood | 73/147 |
| 5,072,172 | A * | 12/1991 | Stolarczyk et al. | 324/332 |
| 5,199,298 | A * | 4/1993 | Ng et al. | 73/54.01 |
| 5,874,671 | A | 2/1999 | Lopez | |
| 6,134,485 | A | 10/2000 | Tanielian et al. | |
| 6,328,467 | B1 * | 12/2001 | Keyhani | 374/16 |
| 6,386,023 | B1 * | 5/2002 | Sajna et al. | 73/146 |

(Continued)

FOREIGN PATENT DOCUMENTS

| | | |
|---|---|---|
| EP | 1028463 A1 | 8/2000 |
| FR | 2749656 A1 | 12/1997 |
| FR | 2860293 A1 | 4/2005 |

OTHER PUBLICATIONS

Int'l Search Report issued Feb. 22, 2011 in Int'l Application No. PCT/FR2010/000751.

(Continued)

*Primary Examiner* — Peter Macchiarolo
*Assistant Examiner* — Alexander Mercado
(74) *Attorney, Agent, or Firm* — Panitch Schwarze Belisario & Nadel LLP

(57) ABSTRACT

The present invention relates to a measuring device comprising a flexible polymer plate (1) and at least one cavity (R0) formed within the polymer plate, comprising a window opening onto an upper face of the polymer plate and configured to receive at least one physical value sensor (SR) arranged in a casing (SP0). The measuring device also comprises electrical conductors (11, 13) embedded in the polymer plate and comprising a termination extending into the cavity (R0), to electrically couple the sensor to an electrical input/output point (4) of the polymer plate. Application mainly to measurements of parietal parameters.

10 Claims, 16 Drawing Sheets

(56) References Cited

U.S. PATENT DOCUMENTS

Figure 3:
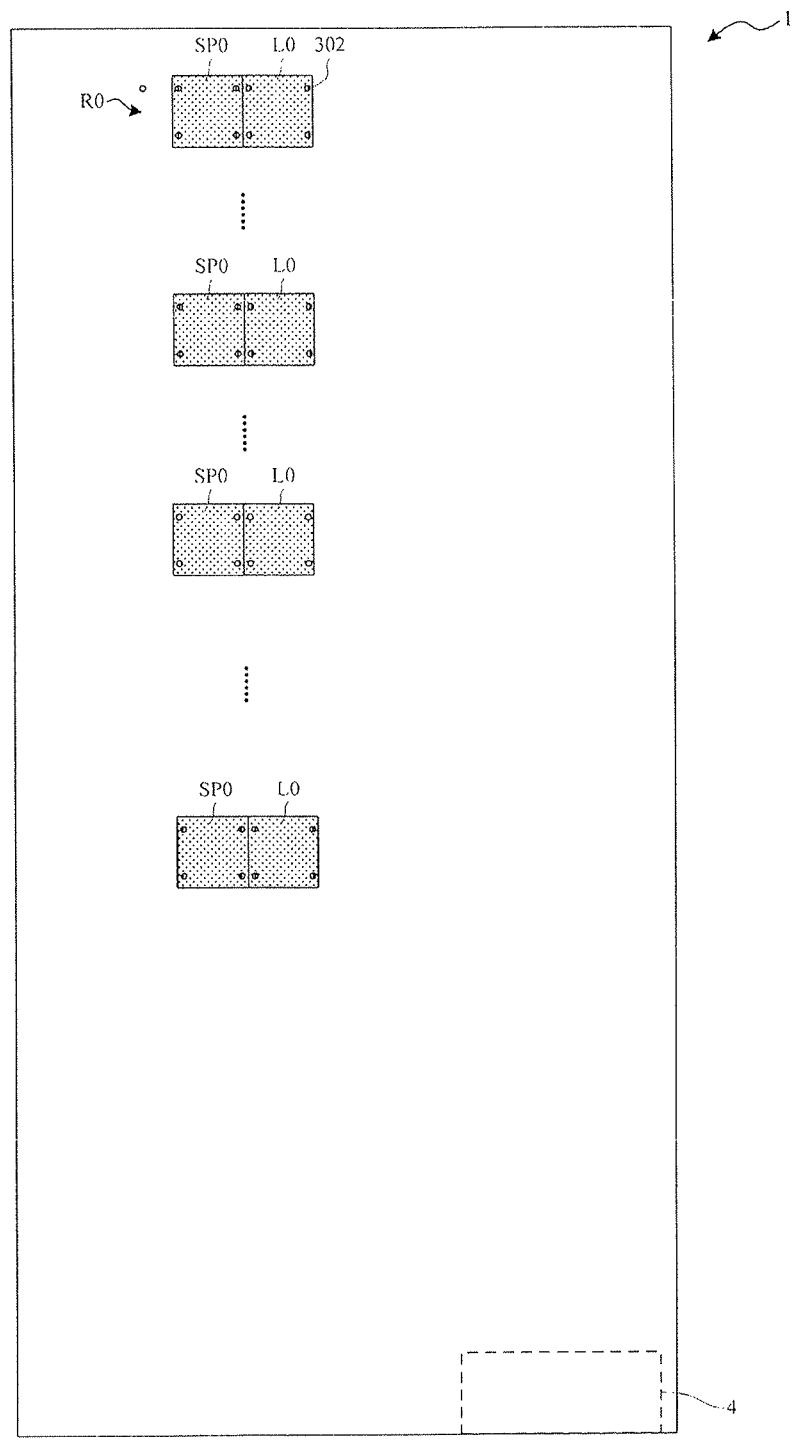

| | | |
|---|---|---|
| 6,772,627 B2 * | 8/2004 | Fleming .................. 73/147 |
| 7,043,977 B2 | 5/2006 | Magnin |
| 7,350,752 B2 * | 4/2008 | Paradis et al. .............. 244/129.1 |
| 7,596,997 B2 * | 10/2009 | Brown et al. .............. 73/170.17 |
| 2002/0088275 A1 * | 7/2002 | Peter .................. 73/147 |
| 2003/0141867 A1 * | 7/2003 | Inoue ................... 324/209 |
| 2004/0150499 A1 | 8/2004 | Kandler |
| 2005/0066722 A1 * | 3/2005 | Magnin ................ 73/170.02 |
| 2006/0202086 A1 | 9/2006 | Paradis et al. |
| 2009/0277266 A1 * | 11/2009 | Wang et al. ................ 73/514.01 |
| 2010/0185403 A1 * | 7/2010 | Kurtz et al. ................ 702/53 |
| 2011/0107829 A1 * | 5/2011 | Wood et al. ................ 73/147 |
| 2011/0224846 A1 * | 9/2011 | Simon ............... 701/3 |

OTHER PUBLICATIONS

Int'l Preliminary Report on Patentability issued May 30, 2012 in Int'l Application No. PCT/FR2010/000751.

\* cited by examiner

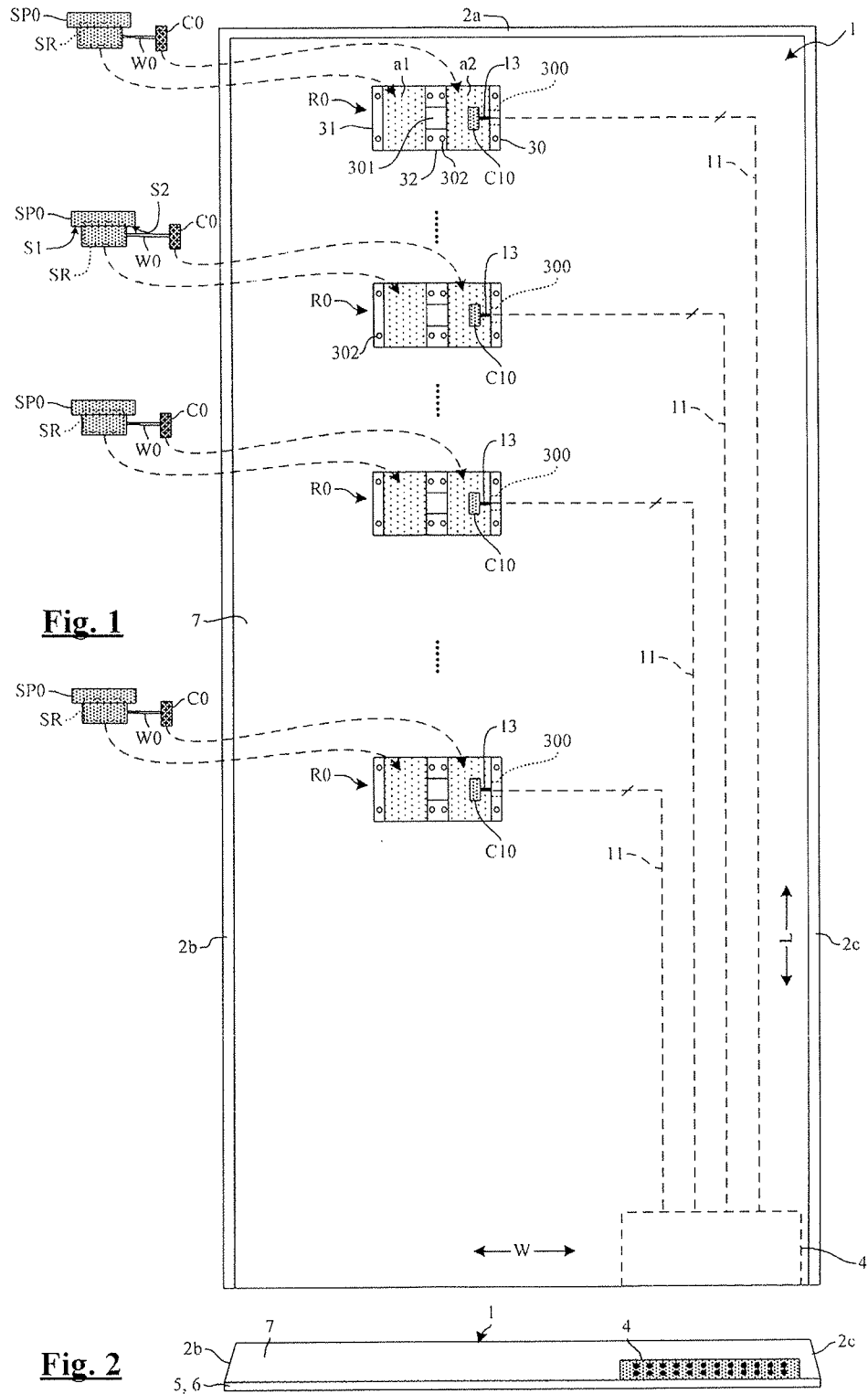

DEVICE FOR MEASURING PARIETAL PARAMETERS

CROSS-REFERENCE TO RELATED APPLICATION

This application is a Section 371 of International Application No. PCT/FR2010/000751, filed Nov. 10, 2010, which was published in the English language on Jun. 3, 2011, under International Publication No. WO 2011/064465 A1, and the disclosure of which is incorporated herein by reference.

The present invention relates to a device for measuring parietal parameters, intended to be arranged on a surface or a wall to measure physical values such as pressure, vibration, temperature, strain, acceleration, and humidity, in the vicinity of the surface or the wall.

Devices of the above-mentioned type are well known in the field of study of aerodynamic structures and particularly in the field of aeronautics. They generally comprise a thin support receiving sensors and means for coupling the sensors to a data collection and processing system.

In particular, the application FR 2 749 656 describes a "Flexible thin film sensor" comprising a thin rigid or semi-rigid support plate, made of metal or epoxy, having an inner face equipped with sensors and bundles of electric links. The support plate is arranged on a receiving surface, for example an aircraft skin, by means of adhesive foam spacers arranged parallel to air streams. The inner face of the support plate is arranged opposite the receiving surface so that the sensors are housed in a low space extending between the support plate and the receiving surface. Holes are formed within the support plate so as to enable pressure to be measured.

Such a device proves to be impractical due to the rigidity that the support plate must have so as to not be distorted under the effect of external pressure. This rigidity implies shaping the support plate so that its shape fits that of the receiving surface, which considerably increases its cost price. Furthermore, this device mechanically uncouples the sensors relative to the receiving surface and prevents vibrations appearing on the latter from being measured.

The application FR 2 860 293 suggests an alternative solution in the form of a support disk made of flexible material, capable of adapting to various forms of aircraft skin, in the center of which a hole is formed that is equipped with a metal insert enabling a sensor to be arranged on the support disk. A radial groove enables electric wires to be passed under the support disk so as to couple the sensor to a measuring circuit.

Such a device is designed to receive only a single sensor and offers a relatively rudimentary means for electrically coupling the sensor. Therefore, the arrangement of a plurality of such devices on a receiving surface poses a tricky problem in terms of grouping together and fixing the electric wires from each device. Furthermore, and like the previous device, the medium in the form of a disk mechanically uncouples the sensor from the receiving surface and does not enable wall vibrations to be measured.

Lastly, U.S. Pat. No. 6,134,485 and the US application 2006/0202086 describe a "sensor belt" intended to be arranged on the wings of a plane. Such a sensor belt comprises a support strip made of a flexible material on which various sensors are coupled to a common wire data bus. Each sensor comprises a substrate of silicon dioxide ($SiO_2$) surrounded by the material forming the belt, a micro-electromechanical sensor (MEMS) arranged on the substrate, and integrated circuits mounted as "flip chips" on the substrate. Such a sensor belt has a complex structure due to microelectronic technologies. It must therefore be manufactured in a clean room and has a high cost price. It is not possible to replace a faulty sensor on-site and the belt must be returned to a clean room for repair. Moreover, the belt must be covered with a fairing, the structure of which is described by the US application 2006/0202086. This fairing enables "plenum chambers" to be created that only allow the stationary pressure to be measured and not pressures generated by turbulence or vibrations. Such a fairing substantially increases the thickness of the belt, which limits its use to large planes in order to remain within the layer limit.

There is therefore a need for a device for measuring parietal parameters that is simple to produce, with a reduced cost price, and that makes it possible to couple several sensors in a simple and practical manner, that does not uncouple the sensors relative to a receiving surface, and that is capable of various applications.

To this end, the present invention proposes a measuring device in the shape of a flexible thin "mat" made of polymer material, capable of being fixed to any surface, in which cavities are formed that are capable of receiving sensors, and electrical conductors extending into the cavities.

More particularly, some embodiments of the present invention relate to a measuring device comprising a flexible polymer plate, at least one first cavity formed within the polymer plate, comprising a window opening onto an upper face of the polymer plate and configured to receive at least one physical value sensor arranged in a casing, and electrical conductors embedded in the polymer plate and comprising a termination extending in the cavity, to electrically couple the sensor to an electrical input/output point of the polymer plate.

According to one embodiment, the cavity comprises at least a first housing to receive the casing of the sensor and a second housing to receive means for coupling the sensor to the electrical conductor termination extending in the cavity.

According to one embodiment, the cavity comprises a separating flange delimiting the first and second housings and providing a bearing surface for the sensor casing so that the sensor casing may be fixed in the cavity.

According to one embodiment, the casing of the sensor is configured so as to have an upper face extending in the plane of the upper face of the polymer plate when the casing is arranged in the cavity.

According to one embodiment, the casing of the sensor has a profile substantially in the shape of a "T" and comprises two edges bearing on an armature of the cavity.

According to one embodiment, the device comprises at least one lid to close all or part of the cavity, the lid being configured so as to have an upper face extending in the plane of the upper face of the polymer plate when it is arranged in the cavity.

According to one embodiment, the electrical input/output point of the polymer plate comprises a connector having a connection face opening onto an edge of the polymer plate.

According to one embodiment, the device comprises an electronic measuring circuit arranged in a second casing, and a cavity formed within the polymer plate and comprising a window opening onto an upper face of the polymer plate, for receiving the second casing.

According to one embodiment, the first cavity comprises a housing for receiving the casing of the sensor, a housing for receiving the casing of the measuring circuit, a housing for coupling the sensor to the measuring circuit, and a housing for coupling the measuring circuit to the termination of electrical conductors extending into the cavity.

According to one embodiment, the polymer plate comprises a second cavity receiving the casing of the measuring circuit, and in which the electrical conductors of the polymer plate comprise first conductors to couple the measuring circuit to the electrical input/output point of the polymer plate, and second conductors to couple the sensor present in the first cavity to the measuring circuit present in the second cavity.

According to one embodiment, the electrical conductors of the polymer plate comprise a first conductive section arranged lengthwise of the polymer plate and a second conductive section arranged substantially widthwise of the polymer plate and linking the sensor or an electronic measuring circuit associated with a sensor to the first conductive section.

According to one embodiment, the first conductive section comprises parallel conductive tracks arranged on a polymer substrate in strip form.

According to one embodiment, the second conductive section comprises electric wires.

According to one embodiment, the device comprises EMI shielding elements embedded in the polymer plate and extending above and below the electrical conductors of the polymer plate.

According to one embodiment, the cavity comprises pads forming an armature of the cavity and providing bearing surfaces on which the casing of the sensor or the casing of an electronic measuring circuit associated with the sensor is stuck or screwed.

According to one embodiment, the polymer plate comprises a support plate made of a flexible material, a polymer substrate arranged on the support plate and on which conductive tracks extend, rigid, semi-rigid or flexible pads arranged on the support plate, forming cavity armatures, electric wires arranged on the support plate, coupled to the conductive tracks, at least one polymer material that covers the support plate, the polymer substrate, the electric wires and partially the pads, in which cavities are formed to receive casings of sensors and/or casings of electronic measuring circuits associated with sensors.

According to one embodiment, the polymer plate comprises an adhesive sheet which extends under the support plate and has a surface substantially greater than that of the support plate, and the polymer material which covers the support plate, the polymer substrate, the electric wires and partly the pads, extends up to the edges of the adhesive sheet so as to form with the adhesive sheet a leading edge minimizing flow disturbance due to the presence of the polymer plate.

According to one embodiment, the polymer plate has a length ranging from a few tens of centimeters to several meters.

According to one embodiment, the polymer plate has a thickness of less than a centimeter, in the order of half a millimeter to a few millimeters.

According to one embodiment, the device comprises at least one sensor chosen from the group comprising pressure sensors, vibration sensors, temperature sensors, strain sensors, accelerometers and hygrometers.

Figure 4:
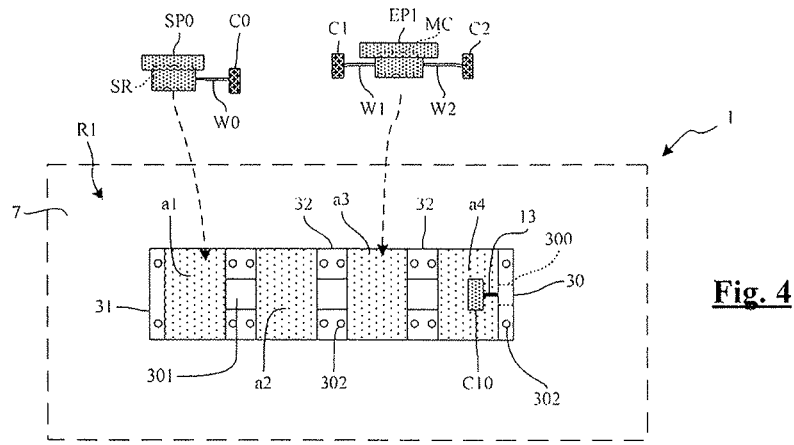
Figure 5:
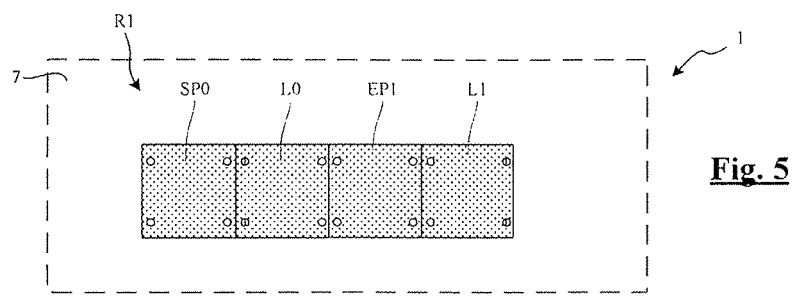
Figure 6:
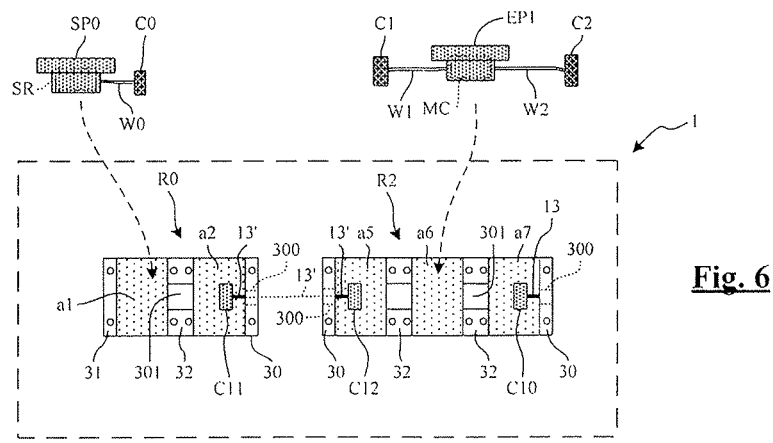
Figure 7:
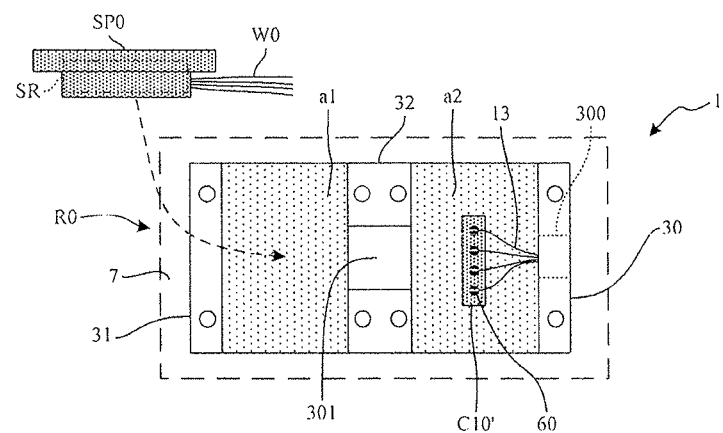
Figure 8:
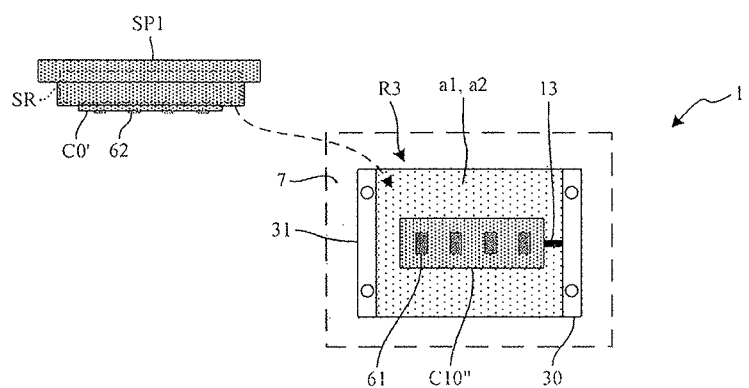
Figure 9A:
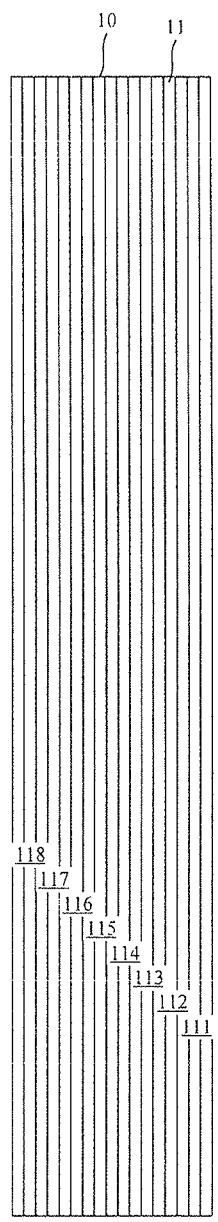
Figure 9B:
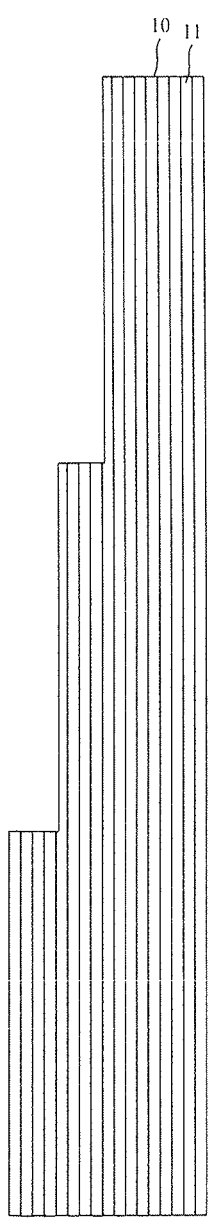
Figure 9C:
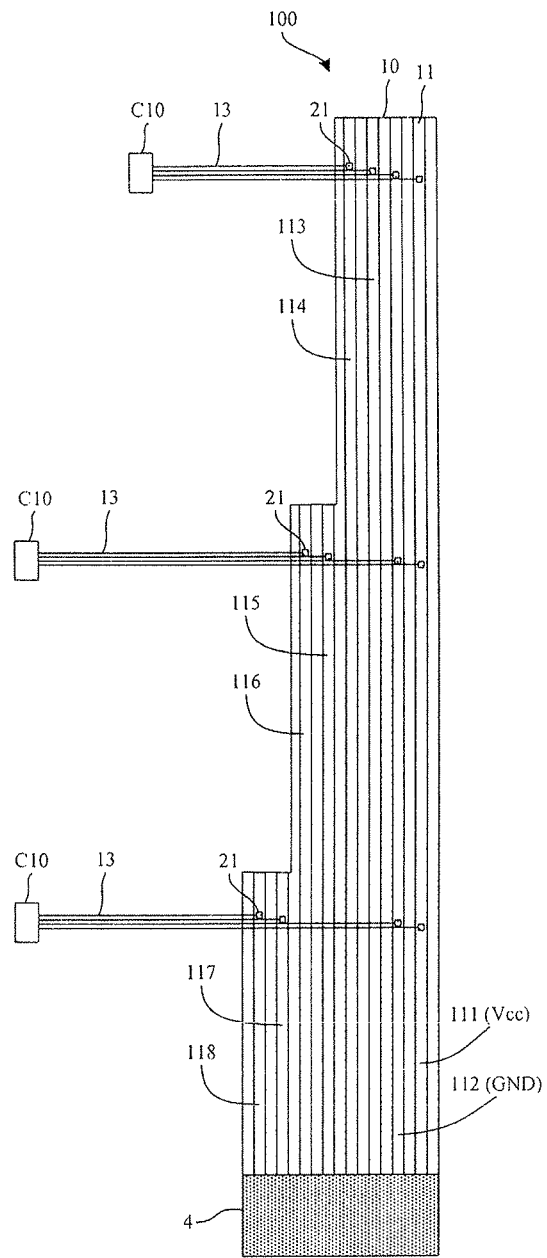
Figure 9D:
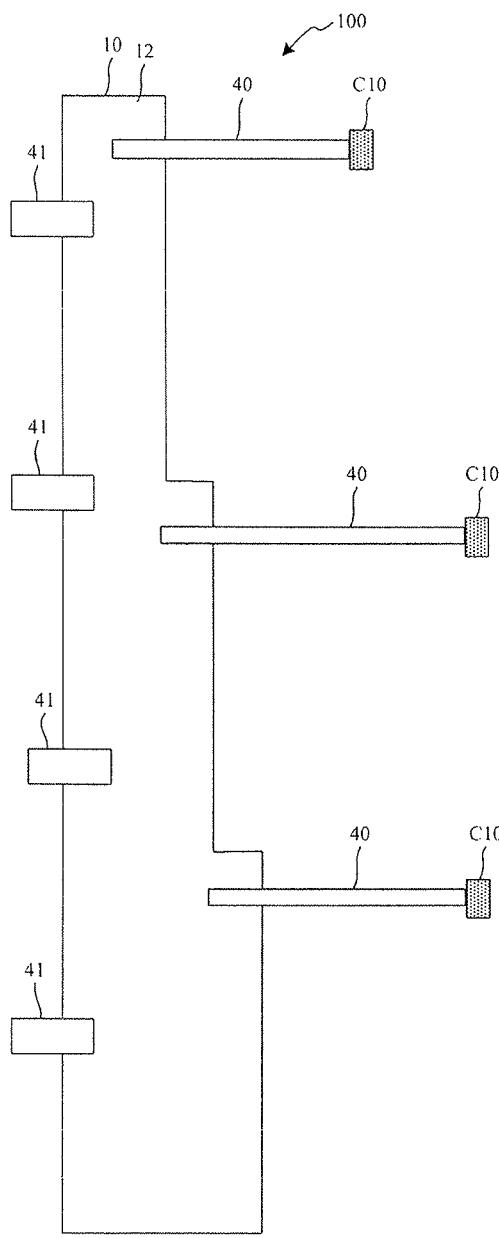
Figure 9E:
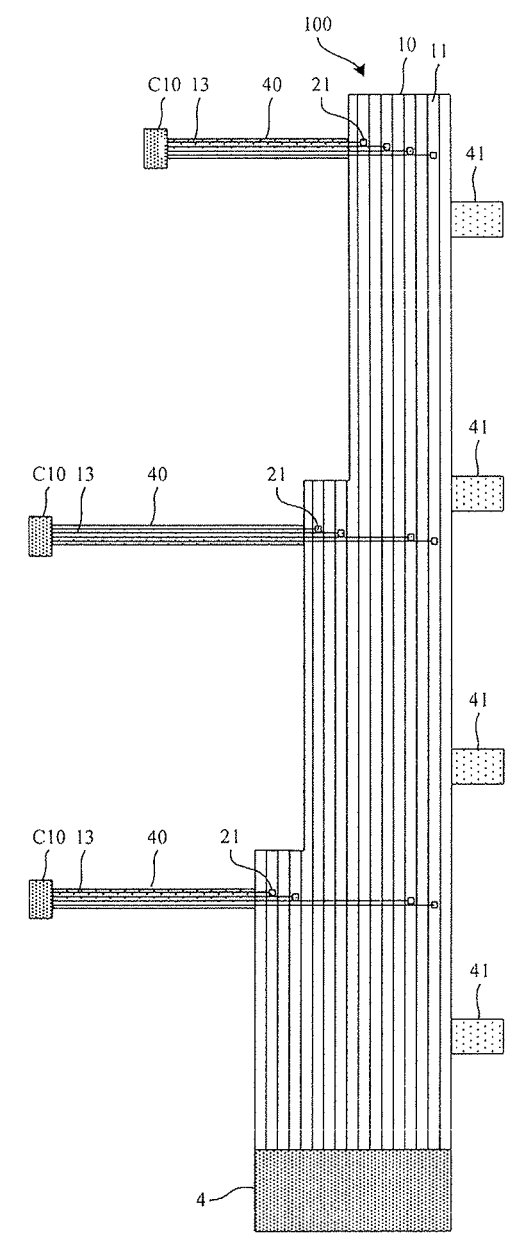
Figure 9F:
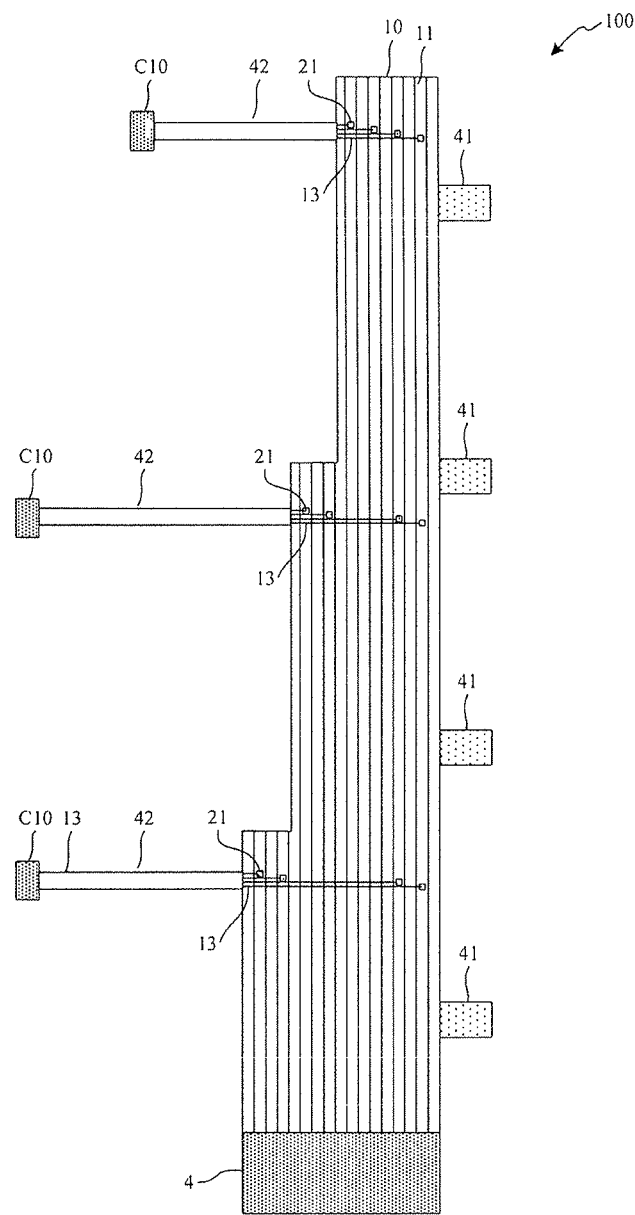
Figure 9G:
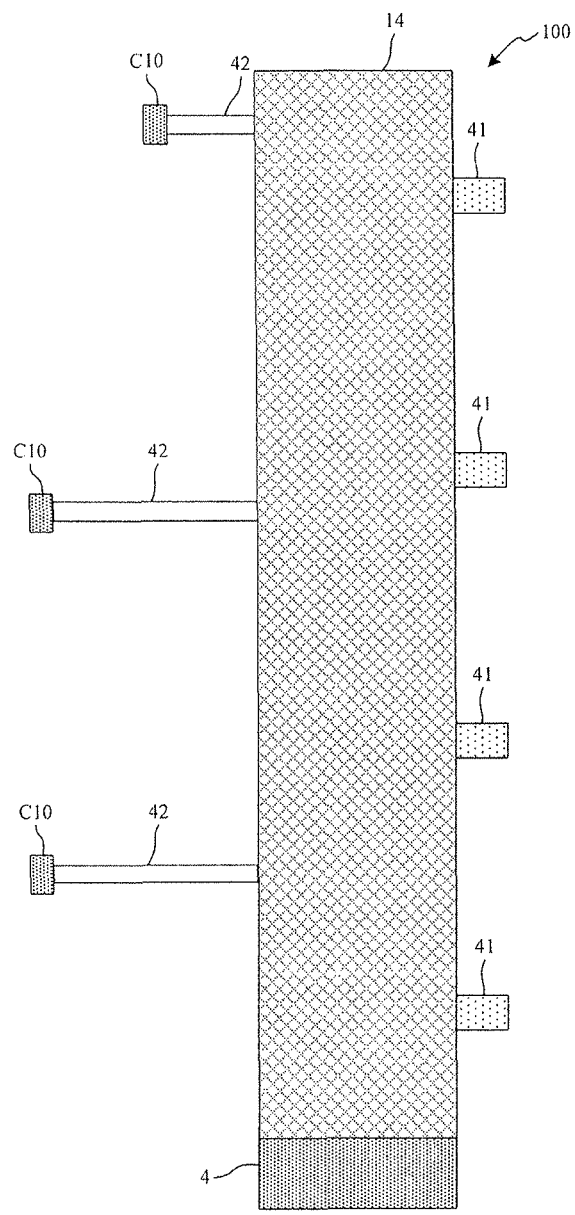
Figure 9H:
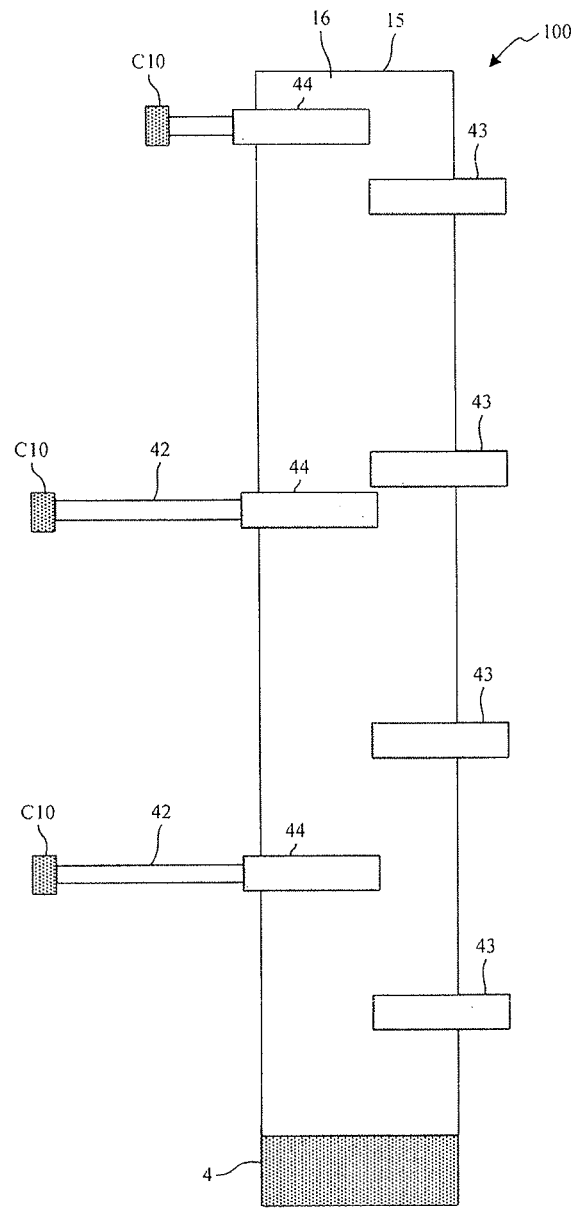
Figure 9I:
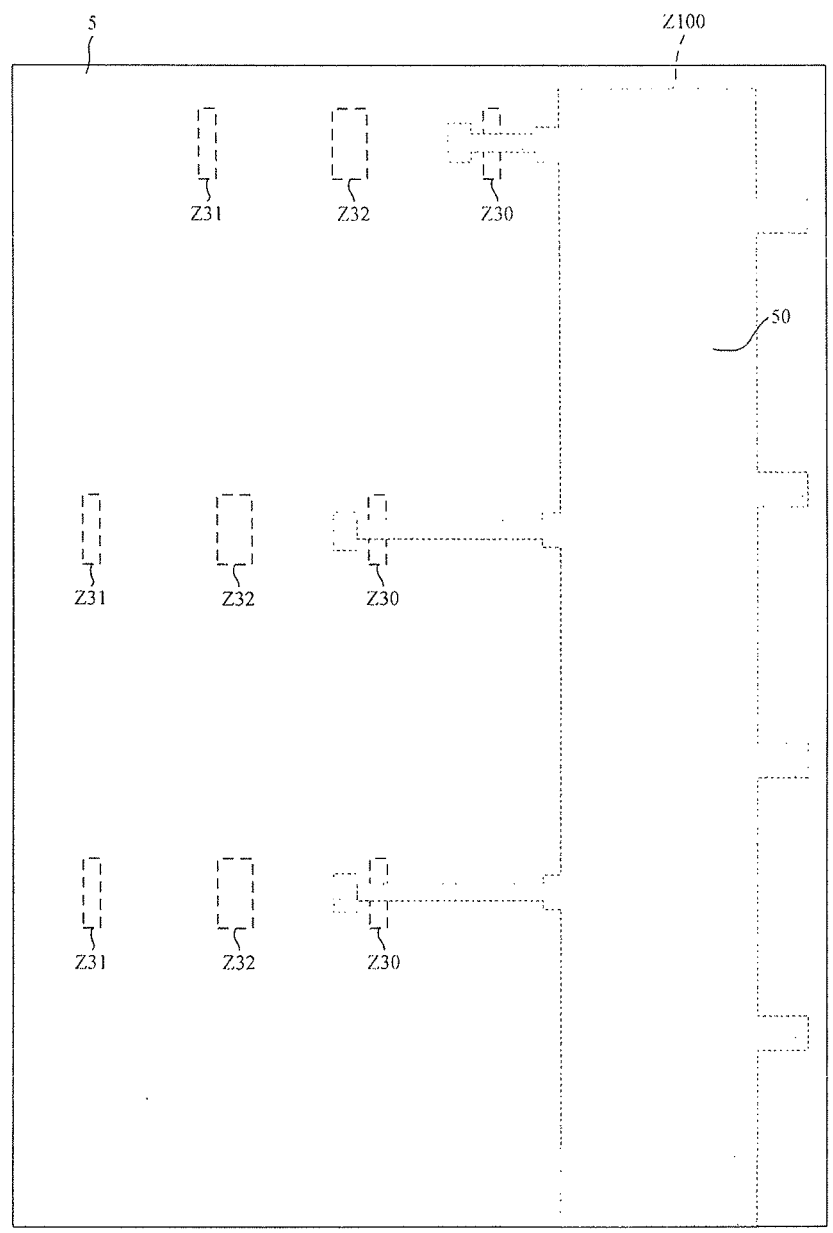
Figure 9J:
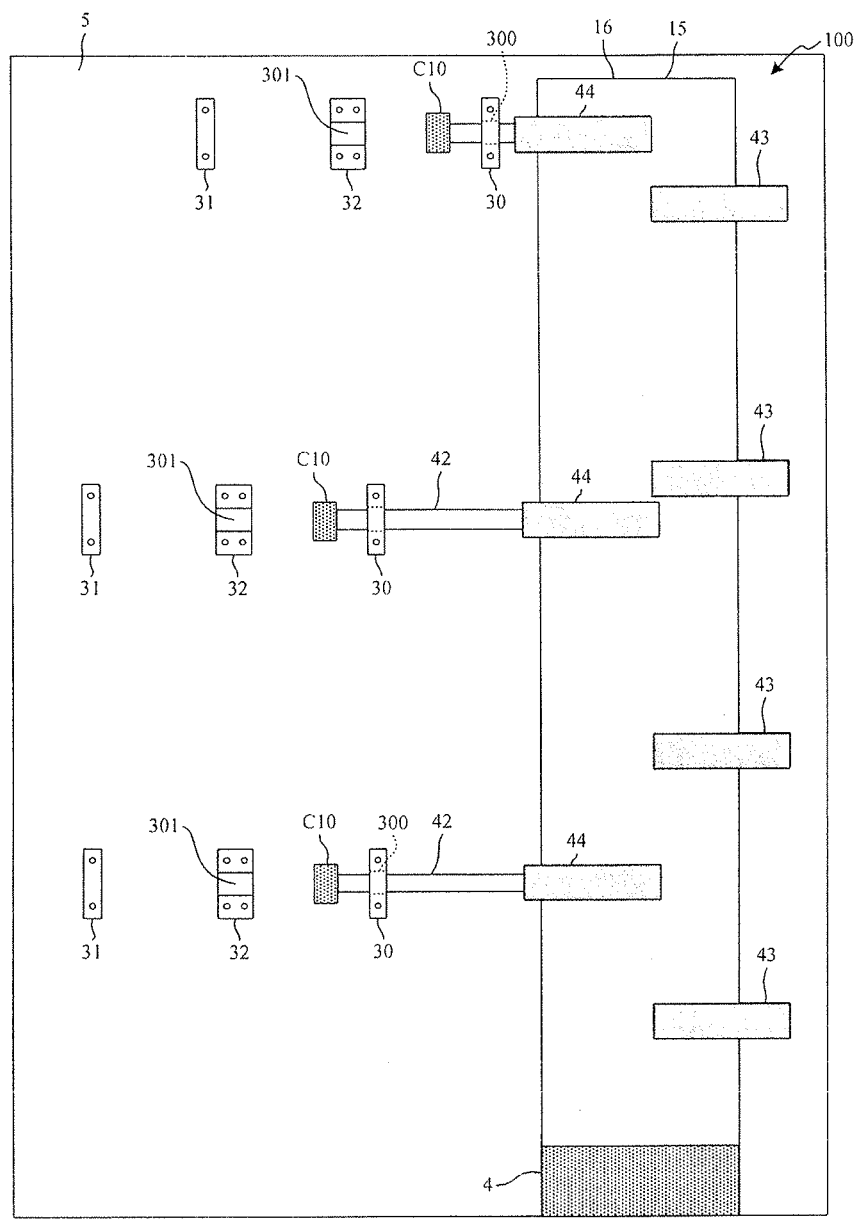
Figure 9K:
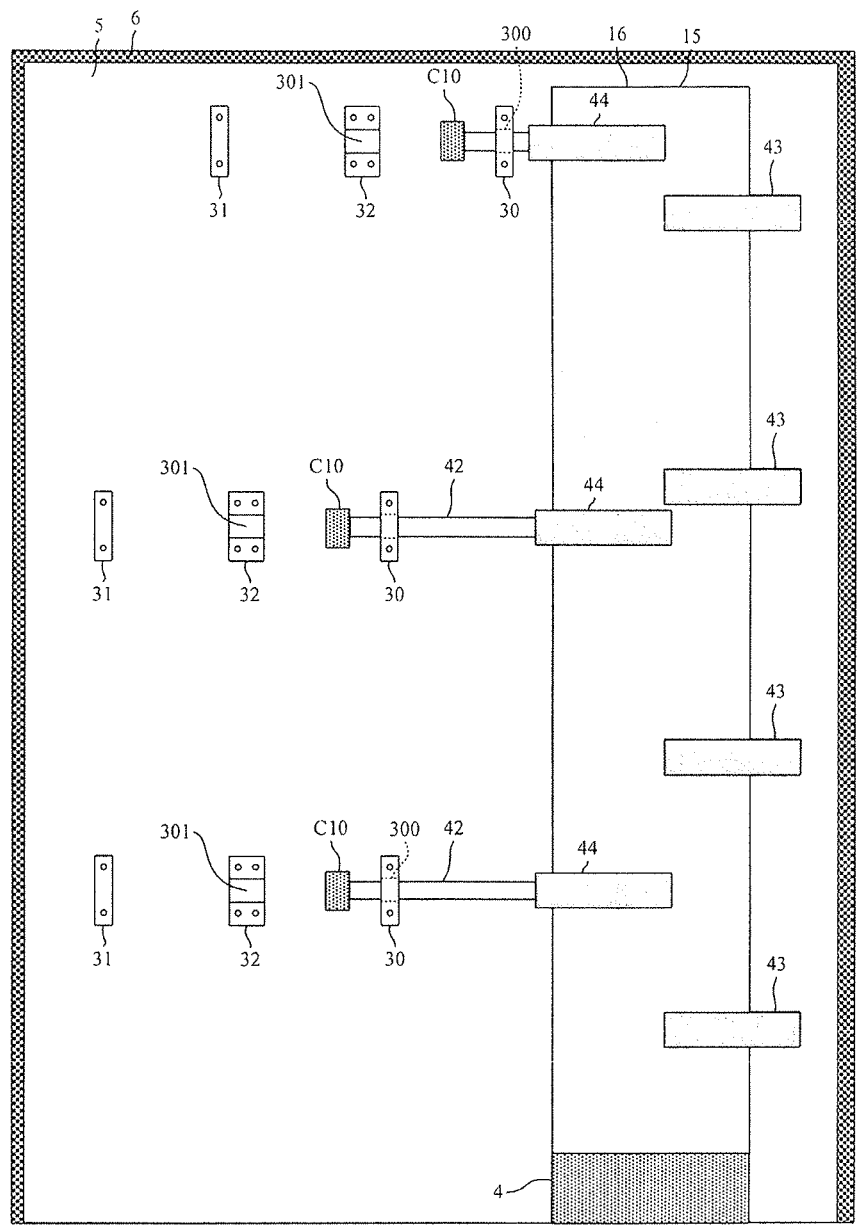
Figure 9L:
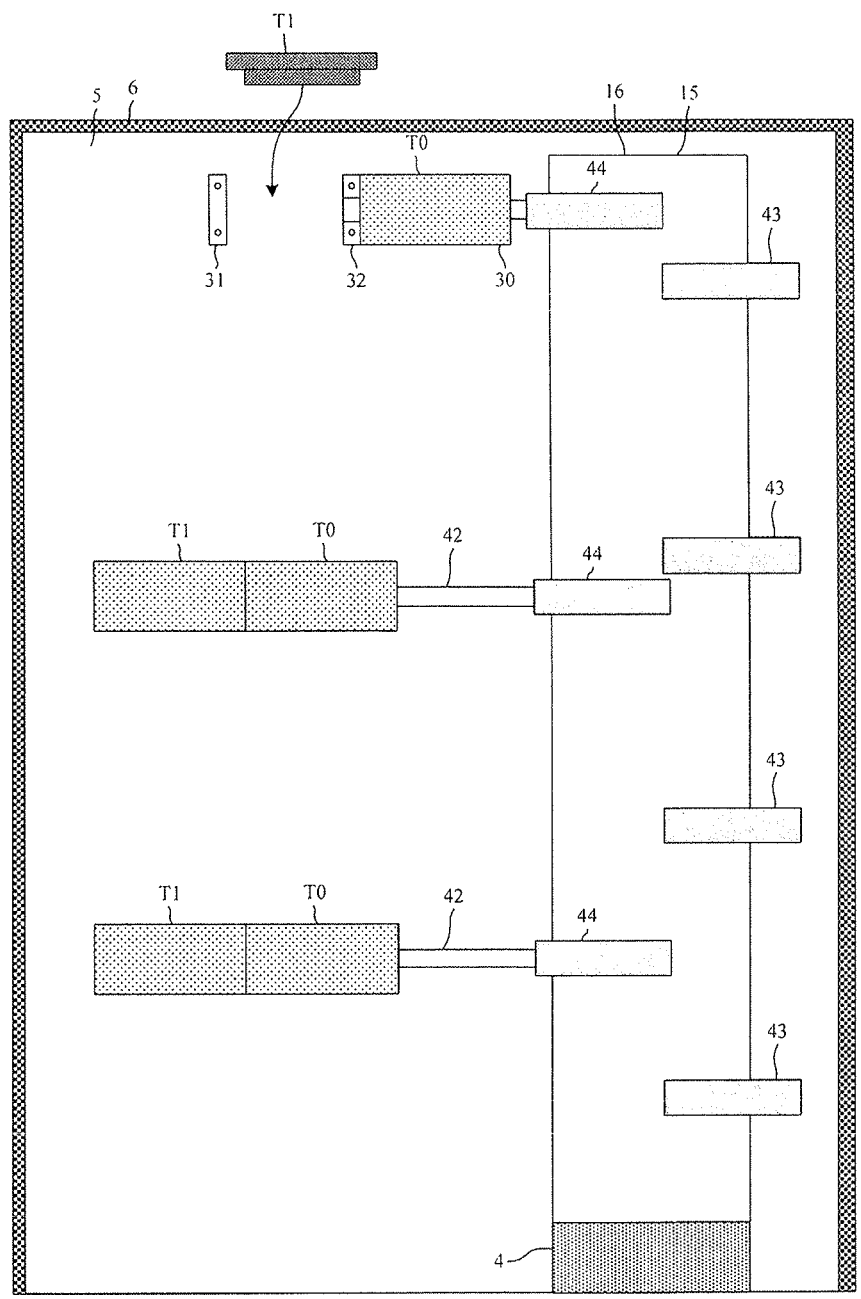
Figure 9M:
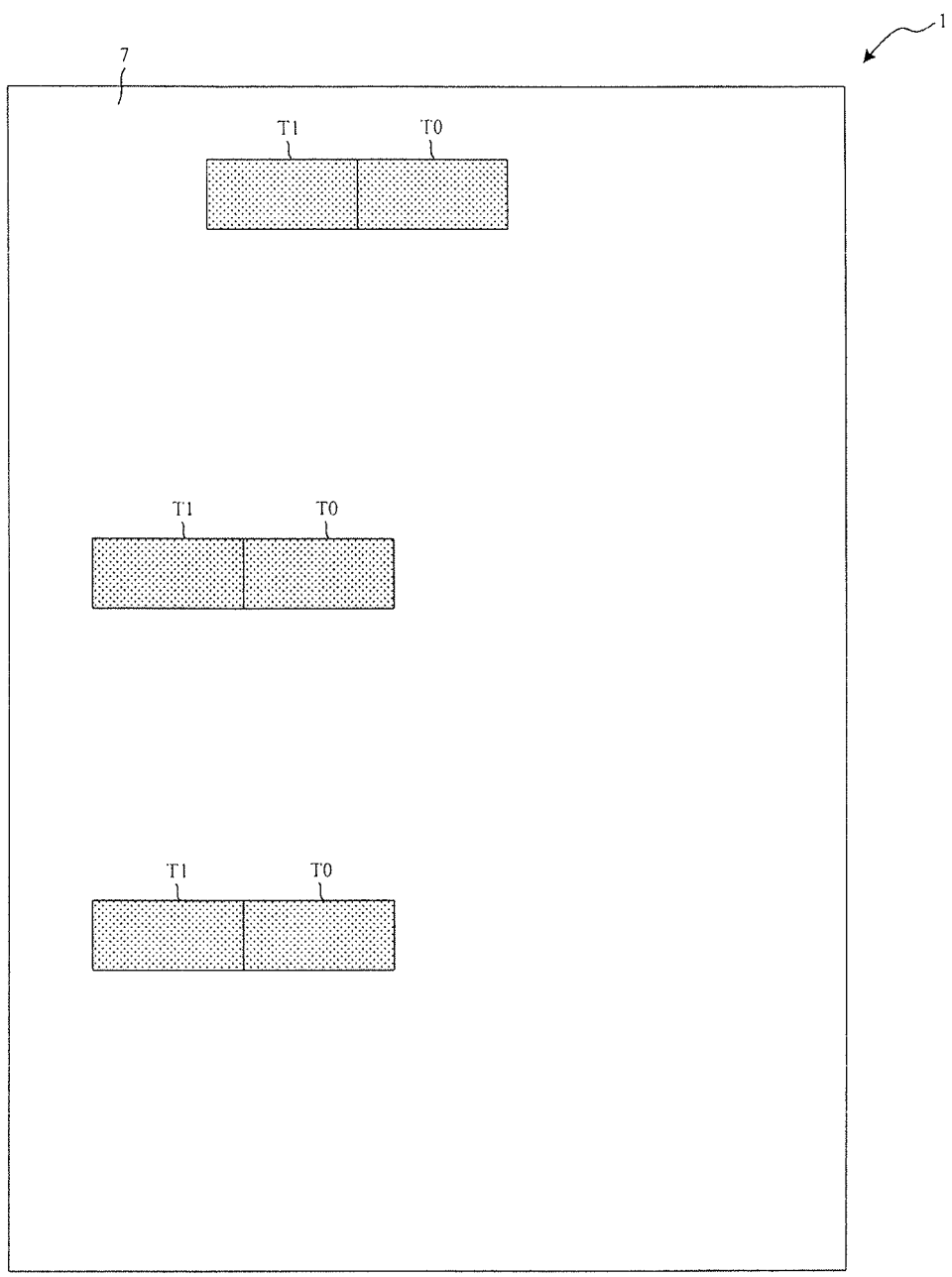
Figure 9N:
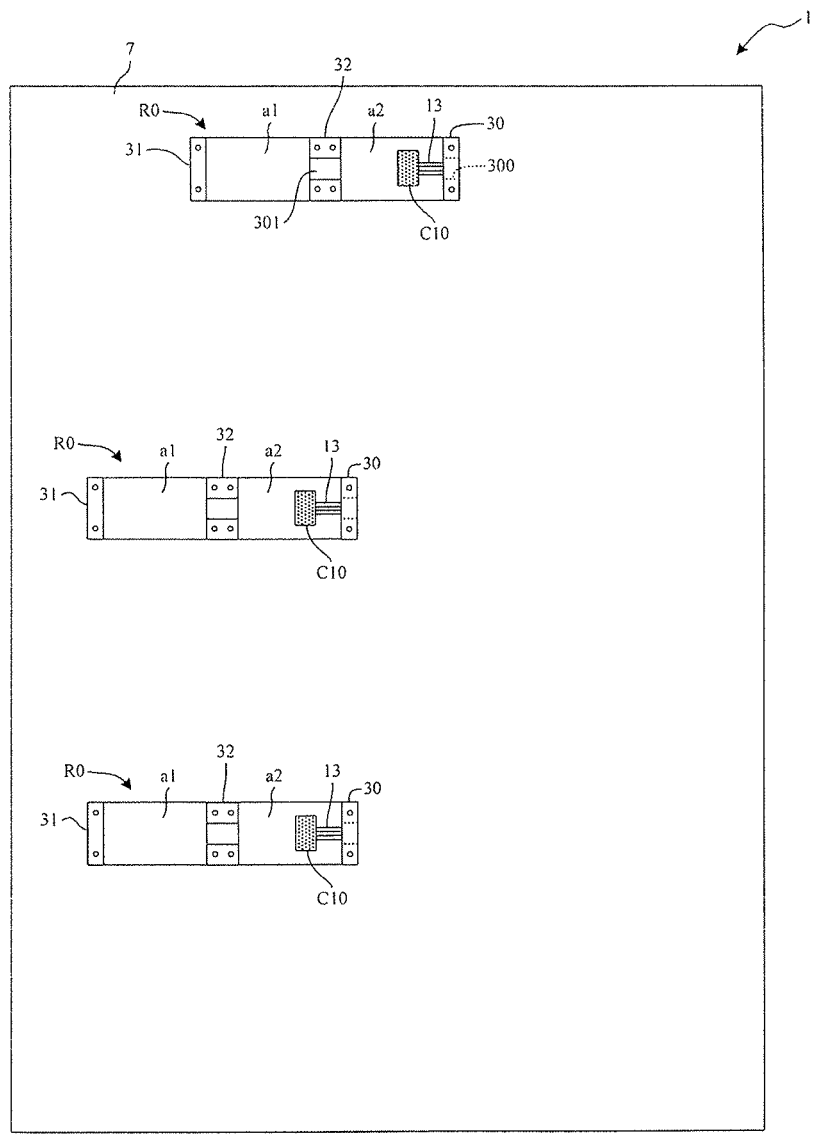
Figure 10:
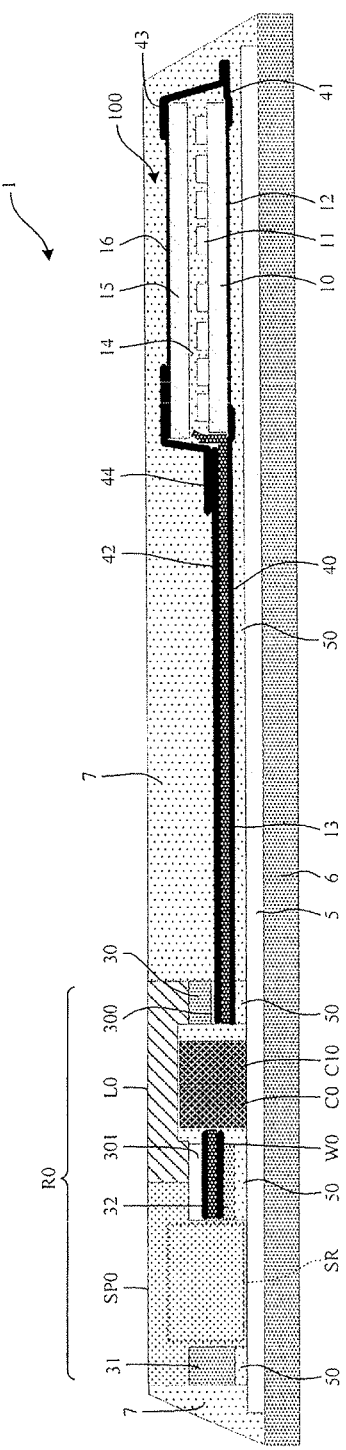
Figure 11:
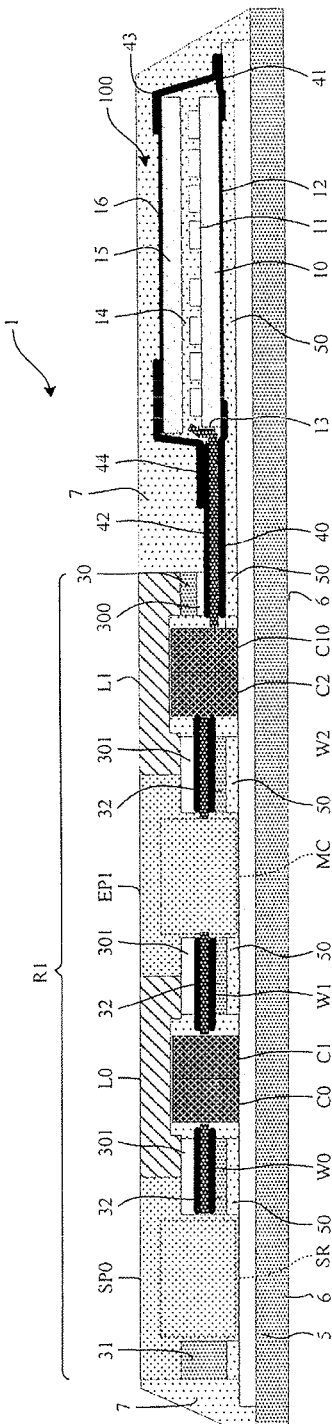

These characteristics will be better understood in the light of the following description of embodiments of measuring devices according to the present invention in relation with, but not limited to, the accompanying figures, in which:

FIG. 1 is a top view of one embodiment of a measuring device according to the present invention and shows a first example of an embodiment of sensor-receiving cavities, FIG. 2 is a rear side view of the device in FIG. 1, FIG. 3 is a top view of the device in FIG. 1, after sensors have been mounted in the cavities, FIG. 4 is a top view of a second example of an embodiment of a sensor-receiving cavity, FIG. 5 is a top view of the cavity in FIG. 4 after a sensor has been mounted in the cavity, FIG. 6 is a top view of a third example of an embodiment of a sensor-receiving cavity, FIG. 7 is a top view of a fourth example of an embodiment of a sensor-receiving cavity, FIG. 8 is a top view of a fifth example of an embodiment of a sensor-receiving cavity, FIGS. 9A to 9N show steps of a method for manufacturing a measuring device according to the present invention, and FIGS. 10, 11 are schematic cross-sectional views of embodiments of the measuring device according to the present invention.

FIG. 1 is a top view of an example of one embodiment of a measuring device according to the present invention and FIG. 2 is a rear side view of the device. The device comprises a flexible and deformable polymer plate 1, cavities R0 formed within the polymer plate 1, sensors SR arranged in the cavities R0, and electrical conductors 11, 13 embedded in the polymer plate 1. Each cavity R0 comprises an access window opening onto the upper face of the plate 1, enabling a sensor SR to be introduced into the cavity. The electrical conductors 11, 13 are arranged so as to couple the sensors SR to an electrical input/output point 4 of the device.

According to one aspect of the present invention, the sensors SR are not mounted bare in the cavities but are previously packaged in casings SP0, the shape of which is designed to fit to the shape of the cavities R0 or vise-versa. Each casing SP0 is equipped with a means for coupling the sensor SR it contains. This coupling means comprises, in the embodiment example shown, electric wires W0, for example four wires, including two power supply leads and two wires to convey a signal sent by the sensor. In the example shown, a connector C0 is further arranged at the end of these wires.

The polymer plate 1 has a width W ranging from a few centimeters to several meters, a length L ranging from a few tens of centimeters to several meters, and a small thickness in relation to its surface, typically of 0.5 to 2 mm and in general less than a centimeter. The polymer plate 1 can be stuck to any type of surface of which parietal parameters must be measured. Its flexibility enables it to fit to any surface shape, whether convex, concave, undulating, etc.

The polymer plate 1 comprises one or more layers of a polymer material 7 deposited on a base 5, 6. These layers of polymer material can have different compositions. For example, the upper face of the plate can be made of a hydrocarbon-resistant polymer material, while the core of the polymer plate 1 can be made of a non-hydrocarbon-resistant polymer material. It preferably has inclined edges 2a, 2b, 2c, at least at the front and on the sides, for aerodynamics purposes. The rear edge of the plate 1 here has a straight profile.

The rear part of the polymer plate 1 here receives a connector 4 forming the electrical input/output point of the device. The connector 4 is embedded in the polymer material 7 except for a connection face opening onto the rear edge of the plate (FIG. 2) and enabling the measuring device to be coupled to a remote data collection and processing system (not shown).

The electrical conductors embedded in the polymer plate 1 comprise bundles of electric wires 13 extending into the cavities R0, and electrical links 11, schematically shown in dotted lines, which couple the electric wires 13 to the connector 4.

The electric wires W0 of each sensor casing SP0 here have terminations equipped with a connector C0. Similarly, the terminations of the bundles of electric wires 13 are equipped with a connector C10 provided for coupling with a connector C0.

Each cavity R0 here comprises two housings a1, a2. The housing a1 is provided for receiving a sensor casing SP0. The housing a2 is provided for receiving the wires W0 of the sensor and the corresponding connector C0, as well as the terminations of electric wire 13 bundles and the corresponding connector C10. The housings a1, a2 are accessible via the window of the cavity, which enables the casing SP0, the wires W0, and the connector C0 to be introduced.

Each cavity R0 further comprises an armature enabling the sensor casing SP0 to be mounted in the housing a1 and a lid to be mounted in the housing a2. In this example embodiment, the armature is produced in a simple manner without requiring a frame, and consists of a proximal flange 30, a distal flange 31 and a separating flange 32 delimiting the housings a1, a2, the other walls of the cavity being formed by the polymer material 7. The proximal flange 30 comprises a groove 300 enabling the termination of a bundle of wires 13 to enter the housing a2, and the separating flange 32 comprises a groove 301 enabling the wires W0 of the sensor to enter the housing a2. Assuming that the polymer plate 1 as shown in FIG. 1 is placed on a horizontal surface, each flange 30, 31, 32 has a horizontal bearing face that is substantially set back from (below) the plane of the upper face of the polymer plate 1.

The sensor casings SP0 here have a profile substantially in the shape of a "T" and are designed to have a first edge S1 bearing on the distal flange 31 and a second edge S2 bearing on the separating flange 32. After mounting a sensor casing SP0 in a housing a1, the connector C0 is coupled to the connector C10, the two connectors are arranged in the housing a2, which is then closed by means of a lid L0.

FIG. 3 is a top view of the polymer plate 1 after the casings SP0 and the lids L0 have been mounted in the cavities R0. The casings SP0 and the lids L0 are designed so that their upper faces are flush with the upper face of the polymer plate 1 so as not to generate any turbulence in the presence of an air stream flowing along the polymer plate. The casings SP0 and lids L0 are fixed by sticking or by means of screws. For screw mounting, threaded orifices 302 are provided in the flanges 30, 31, 32 (FIG. 1).

The sensor SR arranged in each casing SP0 is a mini-sensor of very small size, for example of MEMS type (MicroElectroMechanical System). It may be equipped with an integrated measuring circuit or be associated with a measuring circuit arranged in a distinct casing, as will be seen below.

Generally speaking, the casings SP0 are capable of receiving various types of sensors, mainly pressure, vibration, temperature, strain, acceleration, humidity, etc. In the case of a pressure sensor, the corresponding casing is equipped with a pressure measuring orifice opening onto its upper face and thus onto the upper face of the polymer plate 1.

The sensors SR and their casings SP0 can be standard off-the-shelf products such as encapsulated micro-sensors from the series LLE-2-500, LLE-7DC-500 version E or LLE-6DC-500 marketed by KULITE, or be produced to specifications, by adapting standard products. Sensors derived from the KULITE LL-072 series, and delivered with input/output wires, can be further produced. The adaptation of a standard product to make it compatible with the device according to the present invention may concern the dimensions and the electrical inputs/outputs of the device. The casing may not include any connector, for example the casings of the LL-072 series have electric wires. Such wires can then be coupled by welding to a pad connector of a type described below, or be coupled by means of self-welding sleeves. As another example, a 2- or 4-wire strain sensor from the SG/V series produced by the company HBM can also be used in a measuring device according to the present invention. The sensitive part of such a sensor is arranged between two layers of polyimide forming the casing of the sensor and is equipped with wires W0 without a connector. The wires W0 are coupled to the measuring device for example by welding them onto a pad connector of a type described below, or by means of self-welding sleeves.

In one example of an embodiment, the casings SP0 are 55 mm long, 12 mm wide, and 2 mm and 1 mm thick concerning their edges S1, S2. The lids L0 are 15 mm long, 13 mm wide, and 1 mm thick. The connectors C0, C10 are for example nano-connectors from the OMNETICS NSS series produced by the company OMNETICS CONNECTOR CORPORATION and the wires 13 have a standard diameter AWG30.

FIG. 4 is a top view of a second embodiment of a cavity according to the present invention. As above, the cavity R1 has a window opening onto the upper face of the polymer plate 1, and is configured to receive a sensor casing SP0 and a casing EP1 containing an electronic measuring circuit MC associated with the sensor. By "measuring circuit" is meant any type of electronic circuit required for the associated sensor to function, such as a circuit for compensating, processing, coding and/or shaping signals sent by the sensor, a voltage or current regulator circuit, etc. For example, KULITE sensors from the LLE-1-125 1100 version H series are pressure sensors comprising a sensitive part and an electronic part arranged in separate boxes.

As above, the casing SP0 comprises connecting wires W0 and a connector C0. The casing EP1 of the measuring circuit, also in the shape of a "T", comprises wires W1 linked to a connector C1 intended to be coupled to the connector C0 of the casing SP0, and wires W2 linked to a connector C2 intended to be coupled to the connector C10 of a termination of a bundle of wires 13 (FIG. 1).

The cavity R1 comprises four housings a1, a2, a3, and a4. The armature of the cavity R1 comprises a proximal flange 30 with its groove 300 for the passage of wires 13, a distal flange 31, and three separating flanges 32 each with a groove 301 for the passage of wires. The housing a1 extends between the distal flange 31 and a first separating flange 32, and receives the casing SP0. The housing a2 extends between the first separating flange 32 and a second separating flange 32, and receives the connectors C0 and C1. The housing a3 extends between the second separating flange 32 and a third separating flange 32 and receives the casing EP1. The housing a4 extends between the third separating flange 32 and the proximal flange 30 and receives the connectors C2 and C10.

As shown in FIG. 5, the housings a1, a3 are closed by means of the casings SP0 and EP1, while the housings a2, a4 are closed by means of lids L0, L1. The upper faces of the casings SP0, EP1 and the lids L0, L1 extend in the same plane as the upper face of the polymer plate 1, which thus has no planar defects.

FIG. 6 shows another embodiment of cavities according to the present invention, enabling the housing of a sensor casing SP0 and a casing EP1 of an electronic measuring circuit MC associated with the sensor in the polymer plate 1. The cavity R1 described above is here split into two cavities R0, R2. The cavity R0 is identical to the one described above in relation with FIG. 1 and comprises the housing a1 receiving the casing SP0 and the housing a2 receiving the connector C0. The housing a2 also receives a connector C11 linked to a termination of a bundle of electric wires 13'.

The cavity R2 is provided for receiving the casing EP1 of the measuring circuit MC and comprises housings a5, a6 and a7. The housing a5 extends between a first proximal flange 30 and a separating flange 32. It receives the connector C1 of the measuring circuit and a connector C12 linked to the other termination of the bundle of electric wires 13'. This bundle of wires 13' extends inside the polymer plate 1 and into the housing a2 of the cavity R0, where it is linked to the connector C11. The housing a6 extends between the first separating flange 32 and a second separating flange 32 and receives the casing EP1 of the measuring circuit. The housing a7 extends between the second separating flange 32 and a second proximal flange 30, and receives a termination of a bundle of wires 13, the corresponding connector C10, and the connector C2 of the casing EP1.

When assembling the device, the casing SP0 is arranged in the housing a1 of the cavity R0, the connector C0 is coupled to the connector C11 in the housing a2 of the cavity R0, then the housing a2 is closed by means of a lid. The casing EP1 is then arranged in the housing a6 of the cavity R2, the connector C1 is coupled to the connector C12 in the housing a5, the connector C2 is coupled to the connector C10 in the housing a7, then the housings a5, a7 are closed by means of lids. The sensor SR present in the casing SP0 is thus coupled to the measuring circuit MC by means of the wires 13', passing inside the polymer plate 1. In some embodiments, these wires 13' can be very long, up to several meters in length. In other embodiments, the measuring circuit MC can be coupled to several sensors SR arranged in one or more cavities R0.

Various other alternative embodiments of a cavity for receiving a sensor casing and/or for receiving a measuring circuit casing according to the present invention are possible.

As an example, FIG. 7 shows the cavity R0 already described in which the housing a2, instead of receiving the connectors C0, C10, is equipped with a connector C10' with metal pads 60 upon which the terminations of a bundle of wires 13 are welded. In this case, the sensor casing SP0 does not have a connector C0. The wires W0 of the casing SP0 are directly welded onto the pads 60 of the connector C10' to be electrically coupled to the wires 13. In one alternative, the housing a2 does not comprise a connector and the electric link between the wires W0 and 13 is ensured by means of self-welding sleeves.

As another example of an embodiment, FIG. 8 shows a cavity R3 which comprises two housings a1, a2 vertically superimposed, and which is delimited by a proximal flange 30 and a distal flange 31. The housing a2 extends under the housing a1 without any material separation and receives a flat connector C10" equipped with contact pads 61 and linked to a termination of a bundle of wires 13. The sensor casing SP1 arranged in the cavity R3 comprises on its lower face a flat connector C0' equipped with contact pads 62. When the casing SP1 is inserted into the cavity R3, the contact pads 62 come into contact with the contact pads 61. As above, the casing SP1 may be fixed by screws or by sticking. In the second case, an anisotropic conductive glue can be deposited between the connectors C0' and C10" to ensure good electrical continuity between the contact pads 61 and 62.

It will be understood by those skilled in the art that various alternative embodiments of the present invention are possible. In particular, cavities according to the various types R0, R1, R2, R3 previously described can be provided in a same measuring device according to the present invention, depending on the sensors used, their mode of electrical coupling, and the need, or not, to provide measuring circuits MC in distinct casings.

In certain embodiments, the cavities may receive sensors packaged in casings the shape of which does not correspond to that of the housings a1. In this case, the casings are placed at the bottom of the housings a1 and the latter are closed by means of lids, like the housings a2. Alternatively, a lid common to the housings a1, a2 may in this case be provided for closing the cavity.

In yet other embodiments, several sensors, such as strain gauges, can be arranged in the same cavity. Furthermore, if the device comprises a high number of sensors, several input/output 4 connectors can be provided. Lastly, the lids arranged on the cavities can be made of a flexible material. They are not necessarily flat, and can be of a convex or concave shape designed to match the shape of the polymer plate 1 once the latter is mounted on a non-flat surface.

In the event of large-scale manufacturing of a measuring device according to the present invention, it may be desirable to produce at a low cost the electrical links 11 (FIG. 1) linking the wires 13 extending into the cavities R0, R1, R2, R3 and the input/output connector 4. These electrical links can be very long and it may be desirable to produce them simply and at low cost. Furthermore, it may be desirable for the electrical links 11 and the wires 13 to be protected against electromagnetic interference (EMI) by means of shielding, particularly if the sensors and the measuring circuits used are of analog type and send signals that are not digitized and are thus sensitive to electromagnetic noise.

One embodiment of a method for manufacturing a measuring device according to the present invention that meets these objectives will be described in relation with FIGS. 9A to 9N.

According to this embodiment, the electrical links 11 are produced using a strip of parallel conductors 11 on a polymer substrate, sold in roll form and having an advantageous cost price. This is for example a polyimide/copper double-sided interconnection circuit UPISEL® N BE 1220 with a thickness on the order of 86 micrometers.

During a step shown in FIG. 9A, a polyimide/copper circuit 10 in strip form is unwound and cut to the desired length. In the simplified example shown, one face of the circuit 10 comprises eight copper tracks 11 designated 111 to 118 and the other face comprises a copper ground plane 12. The tracks 111, 112 are designed to convey a supply voltage Vcc and of a ground potential GND to the sensors and to the measuring circuits. The tracks 113, 114 are designed to convey electric signals sent by a first sensor or its measuring circuit, if it is arranged in a separate casing. The tracks 115, 116 are designed to convey electric signals sent by a second sensor or its measuring circuit, and the tracks 117, 118 are designed to convey electric signals sent by a third sensor or its measuring circuit. As shown in FIG. 9B, the tracks can be cut to the desired length according to the locations at which the sensors or their measuring circuits must be arranged. The tracks 111, 112, intended to electrically power all the sensors and/or their measuring circuits, have a length equal to the longest length of the tracks 113 to 118, here the tracks 113, 114.

During a step shown in FIG. 9C, a first bundle of electric wires 13 is coupled to the tracks 111, 112, 113, 114, a second bundle of electric wires 13 is coupled to the tracks 111, 112, 115, 116, and a third bundle of electric wires 13 is coupled to the tracks 111, 112, 117, 118. The couplings 21 between the wires 13 and the tracks 11 are for example made by welding. Each bundle of wires 13 is arranged transversally to the longitudinal axis of the tracks 11, and is equipped here, on its other end, with a connector C10.

It will be noted that for the production of a very wide device, polyimide/copper strips of the same type as the circuit 10, equipped with parallel conductive tracks, can be transversally arranged so as to shorten the length of the wires 13, these then being welded to the ends of the transversal conductive tracks. The transversal conductive tracks and the longitudinal conductive tracks of the circuit 10 can be coupled to each other by any appropriate means, particularly with short sections of electric wires.

Still during the step shown in FIG. 9C, the connector 4 is welded to one end of the circuit 10. The connector 4 is for example an OMNETICS NSS connector of CMS type (i.e. for surface mounting). The connector can be covered with EMI shielding before being mounted onto the circuit 10, for example by surrounding it with a copper strip that is then covered with an insulating layer so as not to cause a short-circuit between the conductive tracks 11.

At the end of these steps, an interconnection block 100 as shown in FIG. 9C is obtained, comprising the circuit 10 arranged longitudinally, the connector 4, the bundles of wires 13 arranged transversally, and the connectors C10.

In other embodiments, the connector 4 could be replaced with another electrical input/output means, for example a layer of wires welded to the circuit 10 and extending beyond the polymer plate.

During steps shown in FIGS. 9D, 9E, 9F, 9G, 9H, both faces of the interconnection block 100 are covered with EMI shielding. The wires 13 are first covered with shielding that is produced here by means of copper strips 40, 42 placed respectively below (FIG. 9D, 9E) and above (FIG. 9F) the wires 13. The copper strips are for example obtained by cutting a roll of adhesive copper 3M® Ref. 1182 with a thickness on the order of 50 micrometers, covered with an electrically conductive adhesive layer. FIG. 9D shows the rear face of the circuit 10, which comprises the copper ground plane 12 mentioned above. Copper strips 41 are also placed on the ground plane 12, to form pads with upper shielding described below.

The upper face of the interconnection block 100 is then covered with a double-sided adhesive film 14 (FIG. 9G) then with a one-sided polyimide/copper sheet, for example reference UPISEL® N SE 1220, with a thickness on the order of 68 micrometers, comprising a polyimide substrate 15 covered by a copper ground plane 16 (FIG. 9H). Other copper strips are then added so as to ensure the continuity between the lower ground plane and the upper ground plane. For example, copper strips 43 are glued so as to straddle the upper ground plane 16 and the strips 41, which are in contact with the lower ground plane 12 (FIG. 9D), and copper strips 44 are glued so as to straddle the ground plane 16 and the strips 42 covering the wires 13.

Those skilled in the art will note that for reasons of simplicity, FIGS. 9D to 9H only schematically show the layout of the shielding elements. Those skilled in the art will make a point of ensuring electrical continuity between the various shielding elements by providing an appropriate arrangement and superimposition of the shielding elements.

At the end of these steps, an interconnection block 100 shielded on its two faces is thus produced, comprising the conductive tracks 11 on a polyimide substrate 10, the connector 4, the wires 13, and their connectors C10.

During a step shown in FIG. 9I, a support plate 5 made of polymer material, for example a plate of Kapton® reference MICEL 200VN, with a thickness on the order of 50 micrometers, is cut to the required dimensions. An implantation zone Z100 for the interconnection block 100 is drawn on the plate 5, as well as implantation zones Z30, Z31, Z32 for proximal flanges 30, distal flanges 31, and separating flanges 32 of the type described above. The zone Z100 is covered with a layer of glue 50 (hatched area), for example an acrylic glue, or with a double-sided adhesive film.

During a step shown in FIG. 9J, the interconnection block 100 is stuck on the plate 5 by means of the layer of glue 50. The flanges 30, 31, 32 are then stuck on the plate 5, after having been covered with glue 50 on their rear face. The flanges are here rigid, semi-rigid, or flexible pads of parallelepiped shape, for example made of stainless steel. The pads intended to form the armature of a cavity are arranged in parallel. The grooves 300 of the flanges 30 are formed on their lower faces, such that when they are stuck onto the plate 5, the groove 300 extends above a bundle of wires 13. The grooves 301 of the flanges 32 are made on their upper faces.

During these steps, shielding elements not shown in the Figures can be provided between the flanges 30, 31, 32 or even under the flanges if they are made of a non-conductive material, as well as electrical continuity elements between these shielding elements and the elements of the interconnection block.

During a step shown in FIG. 9K, the support plate 5 is placed on a double-sided adhesive sheet 6, the surface of which is substantially greater than that of the plate 5. The sheet 6 is for example a 3M® sheet Ref. 9460 with a thickness on the order of 50 micrometers or 3M® 9469 with a thickness on the order of 130 micrometers.

During a step shown in FIG. 9L, protection pieces T0, T1 referred to as "plugs", for example made of Teflon®, are arranged on the flanges 30, 31, 32. These plugs are in the shape of a "T" and press on the flanges 30, 31, 32. Their shape corresponds to the shape desired to be given to the housings a1, a2 described above.

During a step shown in FIG. 9M, the support plate 5 is covered with the polymer material 7 except for the regions where the plugs T0, T1 are located, the latter preventing the polymer material from spreading completely over the plate 5. The polymer material 7 is deposited in one or more layers. The polymer material 7 is for example self-leveling silicone polymer RHODIA® CAF 1. A hydrocarbon-resistant layer can be deposited lastly, for example a DOW CORNING® DC 730 silicone emulsion. The inclined edges 2a, 2b, 2c shown in FIG. 1 can be obtained in various ways, for example by means of a scraper that is passed along the edges before cross-linking the polymer material or by cutting the polymer material once the latter has been cross-linked.

During a step shown in FIG. 9N, the plugs T0, T1 are removed to obtain respectively the housings a1 and a2 of the cavities R0.

The method that has just been described further enables cavities R1, R2, R3 described above to be produced. Various alternative embodiments of this method are possible. For example, in the step shown in FIG. 9J, pads can be stuck onto the plate 5 on either side of the connector 4. Such pads may allow an external connector support plate to be screwed above a connector 4, the holding plate extending beyond the polymer plate 1.

FIG. 10 is a schematic cross-sectional view of the polymer plate 1 and of a cavity R0 produced according to the method that has just been described. FIG. 11 is a schematic cross-sectional view of the polymer plate 1 and of a cavity R1 produced according to this method.

In each figure may be seen the interconnection block 100 and the flanges 30, 31, 32 fixed onto the plate 5 by means of the layer of glue 50, the casing SP0 arranged in the cavity R0 (FIG. 10) or the casings SP0 and EP1 arranged in the cavity R1 (FIG. 11), and the lids L0 (FIG. 10, 11), L1 (FIG. 11). The shielding of the interconnection block 100 is shown in thick lines and comprises the ground planes 12, 16 and the copper strips 40, 41, 42, 43, 44. Shielding elements can also be arranged around the wires W0 (FIG. 10, 11) and W1, W2 (FIG. 11).

As it can be seen in these cross-sectional views, the polymer material 7 covering the support plate 5 extends up to the edge of the adhesive sheet 6. Thus, although the polymer plate 1 is mounted by sticking onto a receiving surface by means of the sheet 6, it has a leading edge minimizing air or fluid flow disturbance due to the presence of the device. The adhesive sheet 6 can further be replaced after use. The sensor casings SP0 and the measuring circuit casings EP1 can also be removed and replaced, whether they are screwed or stuck with a double-sided adhesive film (which will then be replaced with a new adhesive film). Lastly, the cavities can be made watertight, particularly for measurements in a humid environment, hydrodynamic measurements or flow measurements. This water tightness can be obtained in various ways, for example by mounting the casings SP0, EP1 and the lids L0, L1 in the cavities by means of seals and/or by using a sealing varnish.

A measuring device according to the present invention has an advantageous cost price and is capable of various applications, in addition to the traditional applications in the field of aeronautics, particularly in the field of motor vehicles (bodywork aerodynamics), train construction (train and tunnel aerodynamics), shipbuilding (hull hydrodynamics), acoustic studies, and generally speaking any type of application in which measurements of parietal parameters can be useful, such as measuring pressure along the walls of air outlet shafts, air or gas flow pipes, wind tunnel measurements, etc.

The invention claimed is:

1. A measuring device comprising:
    a flexible polymer plate including:
        a support plate made of a flexible material,
        a polymer substrate arranged on the support plate and on which conductive tracks extend,
        rigid, semi-rigid or flexible pads arranged on the support plate, forming recessed cavity armatures,
        electric wires arranged on the support plate, coupled to the conductive tracks, and
        at least one polymer material that covers the support plate, the polymer substrate, the electric wires and partially the pads, in which recessed cavities are formed to receive casings of sensors and/or casings of electronic measuring circuits associated with sensors,
    at least one first recessed cavity formed within the polymer plate, comprising a window opening onto an upper face of the polymer plate and configured to receive at least one physical value sensor arranged in a casing, and
    electrical conductors embedded in the polymer plate and comprising a termination extending into the at least one first recessed cavity, to electrically couple the sensor to an electrical input/output point of the polymer plate.

2. The device according to claim 1, wherein the at least one first recessed cavity comprises at least a first housing to receive the casing of the sensor and a second housing to receive means for coupling the sensor to the electrical conductor termination extending in the at least one first recessed cavity.

3. The device according to claim 2, wherein the at least one first recessed cavity comprises a separating flange delimiting the first and second housings and providing a bearing surface for the sensor casing so that the sensor casing may be fixed in the at least one first recessed cavity.

4. The device according to claim 1, wherein the casing of the sensor is configured so as to have an upper face extending in the plane of the upper face of the polymer plate when the casing is arranged in the at least one first recessed cavity.

5. The device according to claim 1, comprising at least one lid to close all or part of the at least one first recessed cavity, the lid being configured so as to have an upper face extending in the plane of the upper face of the polymer plate when it is arranged in the at least one first recessed cavity.

6. The device according to claim 1, wherein the electrical input/output point of the polymer plate comprises a connector having a connection face opening onto an edge of the polymer plate.

7. The device according to claim 1, comprising:
    an electronic measuring circuit arranged in a second casing, and
    a second recessed cavity formed within the polymer plate and comprising a window opening onto an upper face of the polymer plate, for receiving the second casing.

8. The device according to claim 7, in which the electrical conductors of the polymer plate comprise first and second conductors, wherein the first conductors are configured to couple the measuring circuit to the electrical input/output point of the polymer plate, and the second conductors are configured to couple the sensor present in the at least one first recessed cavity to the measuring circuit present in the second recessed cavity.

9. The device according to claim 1, wherein the electrical conductors of the polymer plate comprise a first conductive section arranged lengthwise of the polymer plate and comprising parallel conductive tracks arranged on a polymer substrate in strip form.

10. The device according to claim 1, comprising:
    conductive tracks embedded in the flexible polymer plate and coupling the electrical conductors to said electrical input/output point of the polymer plate; and
    rigid, semi-rigid or flexible pads embedded in the flexible polymer plate and configured to form recessed cavity armatures.

* * * * *